Dec. 8, 1936.  E. O. SCHJOLIN  2,063,758
LAMINATED RUBBER MOUNTING
Filed Sept. 27, 1935   2 Sheets-Sheet 1

Inventor
Eric Olle Schjolin
By Blackmore, Spencer & Flint
Attorneys

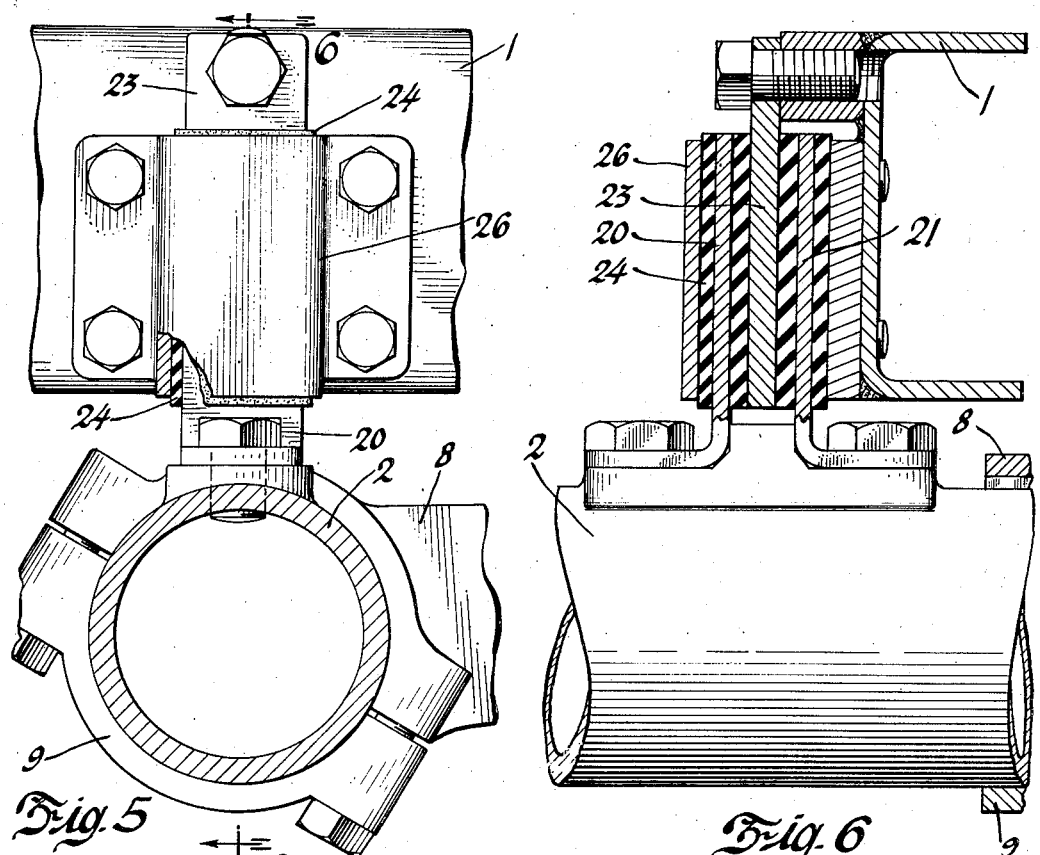
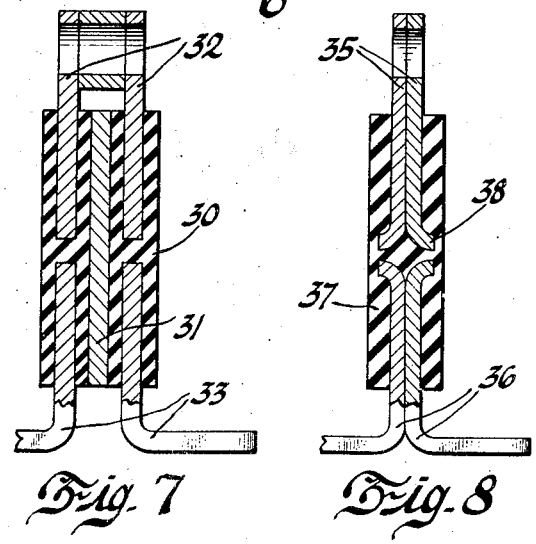
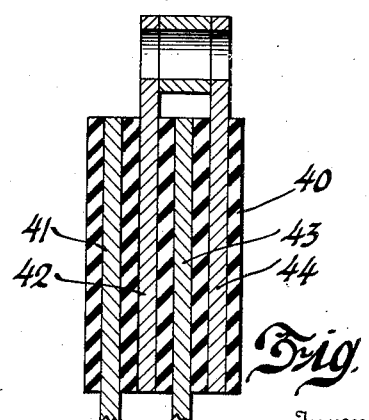

Patented Dec. 8, 1936

2,063,758

UNITED STATES PATENT OFFICE 2,063,758

LAMINATED RUBBER MOUNTING

Eric Olle Schjolin, Pontiac, Mich., assignor to General Motors Corporation, Detroit, Mich., a corporation of Delaware Application September 27, 1935, Serial No. 42,390

5 Claims. (Cl. 280—106)

This invention relates to motor vehicles and more particularly to that type of construction in which a transverse member of the chassis frame is resiliently supported at opposite ends on a pair of independently sprung wheels.

A primary object of the invention is to provide in a chassis frame assembly, a cushioning connection between the wheel suspension carrying member and the frame members joined thereto, for reducing body noises incited by road reaction at the wheels.

A further object is to provide means acting to resist relative rotational and horizontal displacement of the suspension carrying frame member whereby the cushion connection is relieved from torque stresses and brake reaction.

In one embodiment of the invention the transverse framing member, to be resiliently supported on the road wheels, passes through sleeves of cushioning material enclosed within brackets carried by the longitudinal framing members and a torque arm or arms rigid with the transverse member extend angularly therefrom for pivotal connection at its end with an adjacent longitudinal frame member. In another embodiment the torque arm is retained but the cushioned connection consists of a composite rubber and metallic construction in which there are combined laminations of metal and rubber or other elastic deformable material. The rubber preferably acts in shear and the arrangement of laminations may be such as to afford any desired combination of load capacities and spring rate values.

Figure 1:
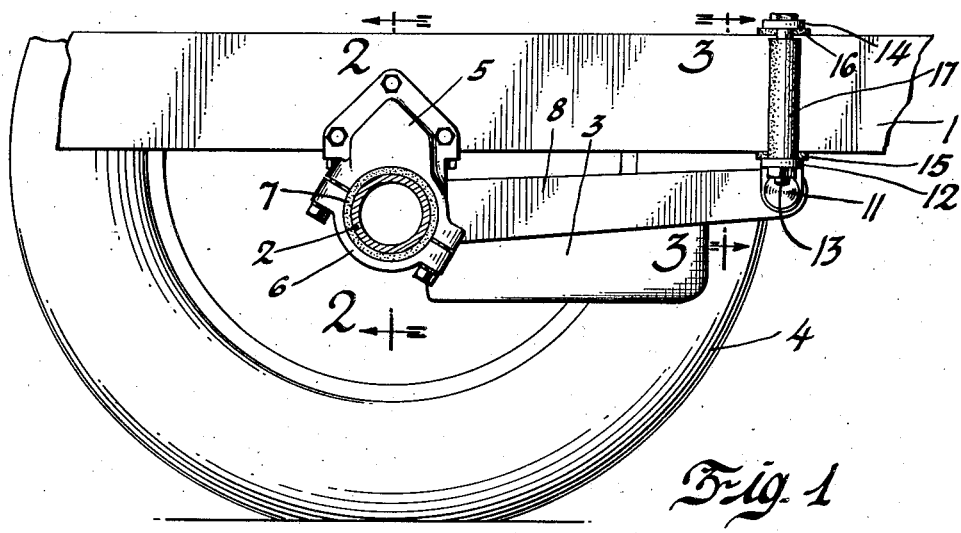
Figure 2:
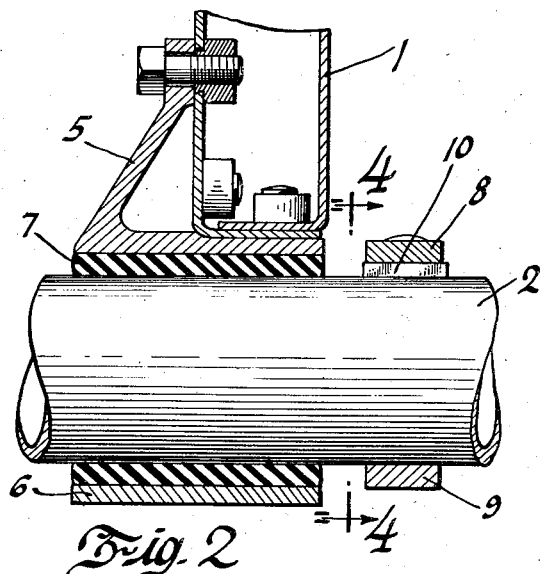
Figure 3:
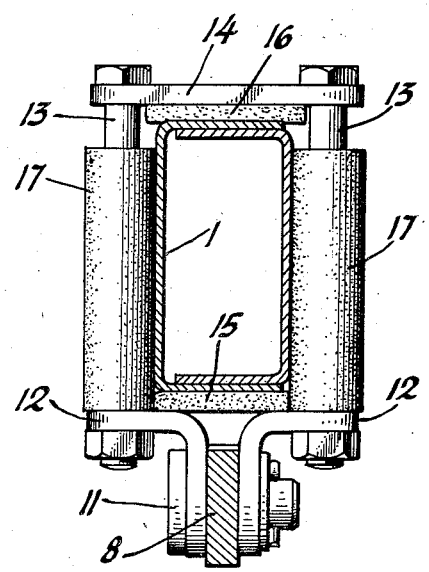
Figure 4:
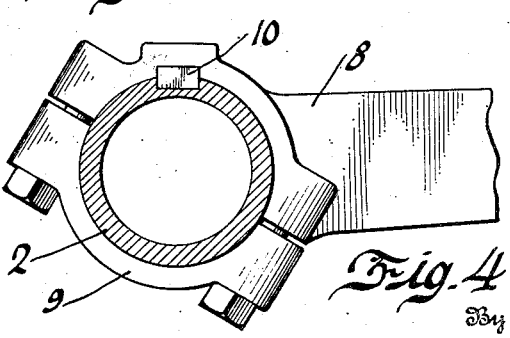

For a better understanding of the invention reference may be had to the accompanying drawings wherein Figure 1 is a fragmentary view of a vehicle with the transverse framing member shown in section on a line longitudinally of the vehicle with other parts in elevation; Figures 2 and 3 are detail sectional views taken, respectively, on lines 2—2 and 3—3 of Figure 1; Figure 4 is a sectional view taken on line 4—4 of Figure 2; Figure 5 is a view similar to Figure 1 showing a modified form of cushion connection; Figure 6 is taken on line 6—6 of Figure 5 and Figures 7, 8 and 9 each show in section alternative forms of the cushioning unit.

Referring to the drawings the chassis frame assembly includes a pair of longitudinally extending and transversely spaced members, one of which is shown at 1, and a transverse member shown at 2. At each end of the transverse framing member 2 there is carried a suspension unit 3 of suitable design through which a wheel 4 is independently sprung.

For joining the transverse and longitudinal framing members, each longitudinal member is provided with a bracket 5 bolted or otherwise rigidly secured thereto, which in cooperation with a removable cap 6 receives therein the transverse member 2. A strip 7 of rubber or other elastic deformable material is wrapped around the framing member 2 and held within the bracket by the cap piece 6. If desired the rubber sleeve may be molded and vulcanized to either or both of the metal parts engaged thereby. By this construction the metal parts are insulated from each other and the rubber sleeve damps shocks and prevents the transmission of noises from one frame member into the other and into the passenger compartment of the vehicle.

To relieve the cushion connection from brake torque reaction or other turning tendency there may be provided adjacent each longitudinal frame member a rigid arm 8 secured at one end to the transverse member 2 by a cap piece 9 and keyed thereto as at 10. At its opposite end the arm 8 is pivoted by means of a pin 11 to the frame member 1. As shown in the drawings the pivotal connection includes a pair of angular plates 12 for receiving the pin 11 and through which extend a pair of clamping bolts 13 passing on opposite sides of the frame member 1, for connection with a clamping plate 14 on the upper side of the frame member. A pad 15 of cushioning material between the underside of the frame member 1 and the plates 12, a similar pad 16 between the frame member and the upper plate 14, and sleeves 17 surrounding the clamping bolts, serve to insulate the torque arm from the chassis frame and eliminates metallic contact. This particular form of pivotal connection is illustrated merely for the purpose of disclosure and it will be understood that other forms of connections may be employed.

In the laminated composite construction shown in Figures 5 and 6 there are employed a pair of metal plates 20 and 21 adapted for connection with the transverse member 2 and an intermediate plate 23 adapted for connection with the longitudinal frame member 1. The several plates are spaced apart and insulated from one another by the use of rubber or other similar material as indicated at 24. The insulating rubber may be in the form of separate strips surface bonded to the several plates or may be an integral mass molded with the plates embedded therein. In this form of the invention the rubber insulation supports the load in shear. The cushioning unit preferably is located or confined within a casing 26 bolted or otherwise anchored to the longitudinal frame member. Optionally the outer faces of the rubber body could be surface bonded to the interior of the casing 26, but it is proposed merely to have these parts in surface engagement, with the casing acting primarily as a protective enclosure for the cushioning unit and into which the unit is readily insertable.

In the embodiment shown in Figure 7 the molded rubber body 30 has floating therein a reinforcing metal plate 31 and a pair of metal plates 32—32, for attachment with one of the frame members and extending partly into the rubber body in alinement with a similar pair of plates 33—33 for attachment to the other frame member. Attaching plates for the respective frame members arranged end to end are shown at 35 and 36 in Figure 8 embedded within the rubber pad 37. In this embodiment the plates of the cooperating pairs are arranged back to back and their inner ends are each turned outwardly as at 38 to interlock with the rubber pad molded thereabout and thereby reduce strain on the surface bond. In Figure 9 the rubber pad 40 has embedded therein the spaced metal plates 41, 42, 43 and 44 and alternate plates are intended for rigid connection, respectively, with the transverse and longitudinal framing members.

I claim:

1. In a motor vehicle, a cushioning connection for use between a pair of framing members, including a rubber strip, a pair of metal parts adapted for rigid association with said framing members and arranged on opposite sides of the rubber strip with their adjacent faces surface bonded to the rubber strip, rubber strips surface bonded to the remote faces of said metal parts, and a casing rigid with one of the frame members in embracing relation to said rubber and metal parts but free of mechanical bond with the rubber strips.

2. In a motor vehicle, a pair of frame members, a casing rigid with one of said members, a plate also rigid with said member and projected into said casing, rubber bonded to both faces of said plate within the casing, a pair of plates rigid with the other frame member and projected in spaced relation, with the first mentioned plate therebetween and surface bonded on their inner faces with said rubber and additional cushions of rubber bonded to the outer faces of said plates and engaged with the interior of said casing without a mechanical bond thereto.

3. In a motor vehicle, a pair of frame members, a casing rigid with one of said members, a series of plates extending into said casing in spaced relation to each other and to the casing means connecting alternate plates rigidly with the respective frame members, and a body of rubber interposed between the plates and casing and surface bonded to the plates and engaging the casing without mechanical bond.

4. In a motor vehicle, a pair of framing members, a casing rigid with one of the frame members, a body of elastic deformable material enclosed within said casing, a pair of plates molded in embedded relation within said body and projecting therefrom in opposite directions beyond the casing and means rigidly connecting said plates and members respectively.

5. In a motor vehicle, a pair of frame members, a pair of plates arranged end to end and adapted for rigid association one with one frame member and the other with the other frame member, and a body of rubber overlapping both plates and being surface bonded thereto to afford a cushioned connection between the frame members.

ERIC OLLE SCHJOLIN.